(12) United States Patent
Banipal et al.

(10) Patent No.: US 11,185,780 B2
(45) Date of Patent: Nov. 30, 2021

(54) ARTIFICIAL INTELLIGENCE PROFILING

(71) Applicant: INTERNATIONAL BUSINESS MACHINES CORPORATION, Armonk, NY (US)

(72) Inventors: Indervir Singh Banipal, Austin, TX (US); Andrew R. Freed, Cary, NC (US); Shikhar Kwatra, New York City, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1256 days.

(21) Appl. No.: 15/495,291

(22) Filed: Apr. 24, 2017

(65) Prior Publication Data

US 2018/0308005 A1   Oct. 25, 2018

(51) Int. Cl.
*A63F 13/67* (2014.01)
*A63F 13/798* (2014.01)
(Continued)

(52) U.S. Cl.
CPC ............ *A63F 13/67* (2014.09); *A63F 13/798* (2014.09); *G06N 3/006* (2013.01); *G06N 3/04* (2013.01); *G06N 3/08* (2013.01); *G06N 20/00* (2019.01)

(58) Field of Classification Search
CPC ....... A63F 13/67; A63F 13/798; G06N 20/00; G06N 3/006; G06N 3/04; G06N 3/08
(Continued)

(56) References Cited

U.S. PATENT DOCUMENTS

2005/0053902 A1   3/2005   Vladimirovich
2005/0071140 A1   3/2005   Ben-Hur
(Continued)

OTHER PUBLICATIONS

Ganzfried, et al., "Game Theory-Based Opponent Modeling in a Large Imperfect-Information Games", Proc. Of 10th Int. Conf, on Autonomous Agents and Multi-agent Systems (AAMAS 2011), May 2-6, 2011, Taipei (Year: 2011).*
(Continued)

*Primary Examiner* — Tsu-Chang Lee
(74) *Attorney, Agent, or Firm* — Cantor Colburn LLP; Brian Welle

(57) ABSTRACT

Technical solutions are described for controlling an artificial intelligent gaming device. For example, a computer-implemented method includes identifying an electronic opponent profile for an opponent. The computer-implemented method also includes selecting, from a profile repository, a first set of artificial intelligence profiles, where machines trained using artificial intelligence profiles from the first set of artificial intelligence profiles have previously defeated the opponent. The computer-implemented method also includes selecting, from the profile repository, a second set of artificial intelligence profiles, where machines trained using artificial intelligence profiles from the second set of artificial intelligence profiles have previously lost to the opponent. The computer-implemented method also includes generating a current artificial intelligence profile based on the first set of artificial intelligence profiles and the second artificial intelligence profiles. The computer-implemented method also includes configuring a machine according to the current artificial intelligence profile to play against the opponent.

20 Claims, 7 Drawing Sheets

(51) Int. Cl.
 *G06N 20/00* (2019.01)
 *G06N 3/00* (2006.01)
 *G06N 3/04* (2006.01)
 *G06N 3/08* (2006.01)

(58) Field of Classification Search
 USPC .......................................................... 706/12
 See application file for complete search history.

(56) References Cited

U.S. PATENT DOCUMENTS

| | | | |
|---|---|---|---|
| 2006/0246973 A1* | 11/2006 | Thomas | A63F 13/42 463/4 |
| 2007/0196809 A1 | 8/2007 | Sen | |
| 2014/0194191 A1* | 7/2014 | Arnone | G07F 17/3204 463/25 |
| 2015/0126286 A1 | 5/2015 | Guo | |

OTHER PUBLICATIONS

Yun, et al., "PADS: Enhancing Gaming Experience Using Profile-Based Adaptive Difficulty System", Sandbox'10: Proceedings of the 5th ACM SIGGRAPH Symposium on Video Games, Jul. 2010, pp. 31-36 (Year: 2010).*

Svaton, et al., "Improving strategy in robot soccer game by sequence extraction", Procedia Computer Science 35 (2014) 1445-1454 (Year: 2014).* https://www.reddit.com/r/gamedev/comments/3d24u5/using_neural_networks_to_create_advanced_video/?sort=new, submitted Jul. 12, 2015, accessed Sep. 19, 2016, pp. 1-18.

Nash, "Non-Cooperative Games," Annals of Mathematics, 54(2), second series, 286-295, retrieved from http://www.jstor.org/stable/1969529, 1951, pp. 1-11.

* cited by examiner

ARTIFICIAL INTELLIGENCE PROFILING

BACKGROUND

The present invention relates to computer technology and more particularly to, artificial intelligence (AI) systems to adapt to personality traits of human players, in addition to game play.

Artificial intelligence aims to produce a machine that exhibits characteristics associated with human intelligence, such as language comprehension, problem solving, pattern recognition, learning, and reasoning from incomplete or uncertain information. Typically, AI systems rely on faster computer hardware, larger memories, databases, and knowledge bases to act as expert systems that perform well at specific tasks, such as playing chess or diagnosing medical conditions, as long as the procedures and objectives are precisely defined and do not change.

SUMMARY

Embodiments of the present invention are directed to a computer-implemented method for controlling an artificial intelligent gaming device. A non-limiting example of the computer-implemented method includes identifying an electronic opponent profile for an opponent. The computer-implemented method also includes selecting, from a profile repository, a first set of robot profiles, where robots trained using robot profiles from the first set of robot profiles have previously defeated the opponent. The computer-implemented method also includes selecting, from the profile repository, a second set of robot profiles, where robots trained using robot profiles from the second set of robot profiles have previously lost to the opponent. The computer-implemented method also includes generating a current robot profile based on the first set of robot profiles and the second robot profiles. The computer-implemented method also includes configuring a robot according to the current robot profile to play against the opponent.

Embodiments of the present invention are directed to a system for controlling an artificial intelligent gaming device. A non-limiting example of the system includes a computer-game system including a memory, a robot configured to play a game against an opponent, and a processor coupled with the memory and the robot. The processor identifies an electronic opponent profile for the opponent. The processor further selects, from a profile repository, a first set of robot profiles, where robots trained using robot profiles from the first set of robot profiles have previously defeated the opponent. The processor further selects, from the profile repository, a second set of robot profiles, where robots trained using robot profiles from the second set of robot profiles have previously lost to the opponent. The processor further generates a current robot profile based on the first set of robot profiles and the second robot profiles. The processor further configures the robot according to the current robot profile to play against the opponent.

Embodiments of the invention are directed to a computer program product for controlling an artificial intelligent gaming device, the computer program product comprising a computer readable storage medium having program instructions embodied therewith. The program instructions are executable by a processor to cause the processor to perform a method for training a robot for gameplay. A non-limiting example of the method includes identifying an electronic opponent profile for an opponent. The method further includes selecting, from a profile repository, a first set of robot profiles, where robots trained using robot profiles from the first set of robot profiles have previously defeated the opponent. The method further includes selecting, from the profile repository, a second set of robot profiles, where robots trained using robot profiles from the second set of robot profiles have previously lost to the opponent. The method further includes generating a current robot profile based on the first set of robot profiles and the second robot profiles. The method further includes configuring a robot according to the current robot profile to play against the opponent.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
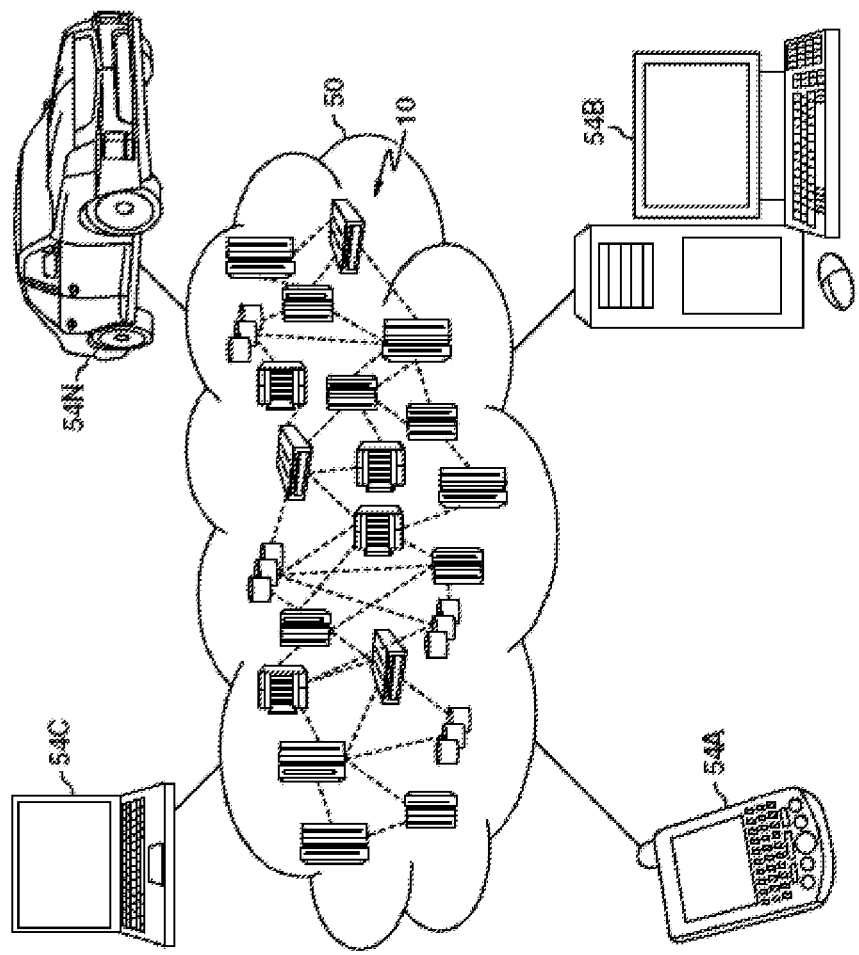
FIG. 1 depicts a cloud computing environment according to an embodiment of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
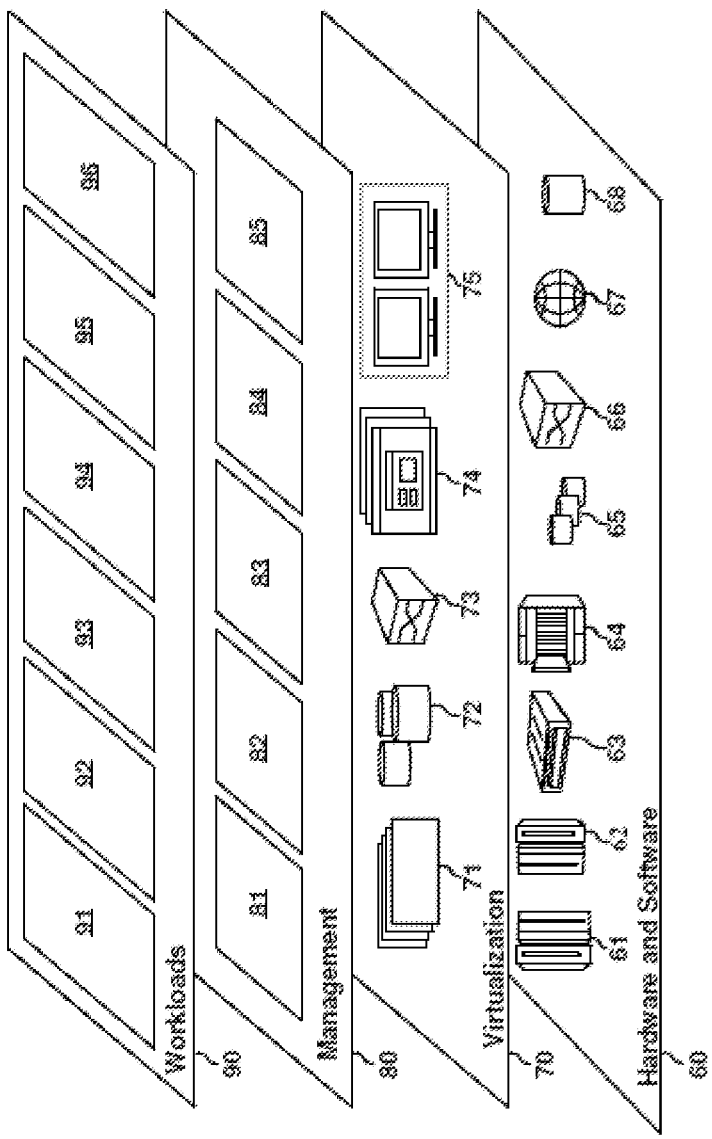
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and game playing 96.

Turning now to an overview of technologies that are more specifically relevant to aspects of the invention, artificial intelligence systems, such as a computer chess system, employed a combination of computationally intensive brute-force searching of possible chess positions for several moves ahead, sophisticated scoring and searching heuristics, and a database of openings and end-games that was able to defeat the world's top-rated human chess player at the time. What chess audiences had witnessed, however, was merely a triumph of brute force computation to solve a particular problem, not a feat of general intelligence. The technical solutions herein, in addition to using such heuristics, facilitate using human personality data in order to defeat an opponent. Thus, the technical solutions use a combination of game strategy and the human personality (both defined in mathematical forms) in order to train one or more game-playing models and evolve into better personalities to defeat an opponent. For example, the technical solutions facilitate the game-playing model to defeat an opponent, such as a human player, considering one-to-one relations between two players (instead of transitive relations) and uses them to create evolved personalities which are more likely to defeat the opponent. Further, the technical solutions facilitate collaborating independent AI systems to share intelligence and evolve, to defeat opponents over time.

It should be noted that while chess and/or poker are used in the examples described herein, the technical solutions herein are not limited to those games, rather the technical solutions are applicable to any artificial intelligence system used to play a game against another player, such as draughts, checker, etc.

Turning now to an overview of the aspects of the invention, one or more embodiments of the invention address the above-described shortcomings of the prior art by providing, irrespective of the game being played, techniques for training one or more AI models using a game strategy, such as the AI based logic typically seen online in the form of online poker, chess etc., and in addition facilitates training the models using the human personality traits, to defeat human opponents. In one or more examples, the technical solutions define the human personality in form of mathematical terms and use it to train and evolve the AI models. Further, the technical solutions train independent AI models in a non-transitive way (A defeat B and B defeat C does not mean A defeat C because of personality issues). Further yet, the technical solutions facilitate the independent models to collaborate to defeat an opponent.

The above-described aspects of the invention address the shortcomings of the prior art by making independent AI models collaborate to evolve into better personalities, which can defeat humans in aggressive games like poker, chess etc., particularly by inclusion of human personality part in the form of mathematical terms and using it to train and evolve AI models.

Figure 3:
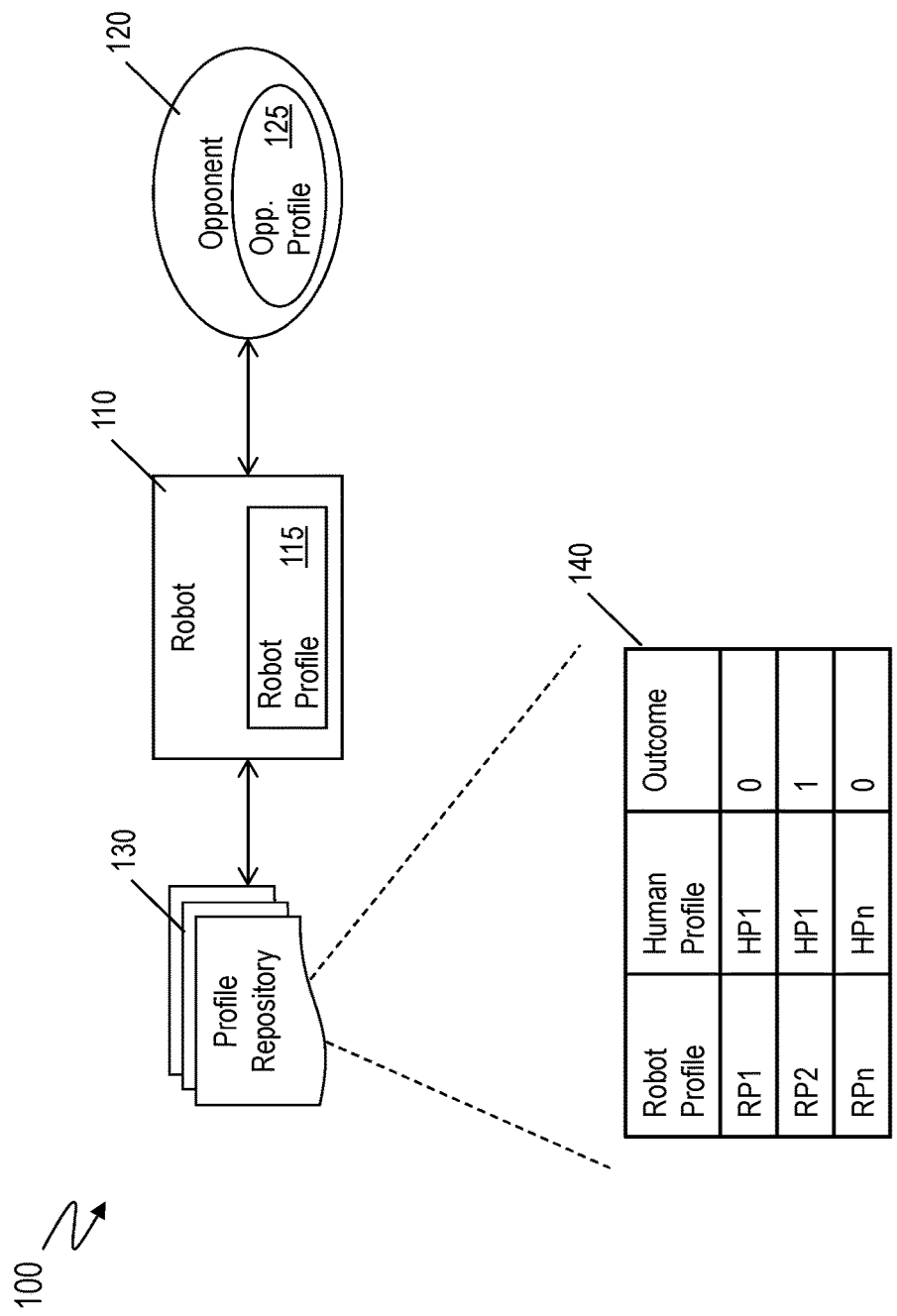
FIG. 3 depicts a computer gaming system 100 according to embodiments of the invention.

Turning now to a more detailed description of aspects of the present invention, FIG. 3 depicts a computer gaming system 100 according to embodiments of the invention. In one or more examples, the computer gaming system 100 is cloud-based, for example, using layer 96 (FIG. 1). In one or more examples, the computer gaming system 100 includes a robot 110 that plays a game, such as chess, poker, etc. with an opponent 120. In one or more examples, the opponent 120 is a human operator. The robot 110 plays the game with the opponent 120 based on a robot profile 115. In one or more examples, the robot profile 115 is determined based on an opponent profile 125 of the opponent 120. In one or more examples, the robot 110 determines the robot profile 115 based on information accessed from a profile repository 130. The profile repository 130 stores a mapping 140 between one or more robot profiles and human profiles that have competed in the game previously. The mapping 140 also stores outcomes of the previous games between the robot profiles and the human profiles.

Figure 4:
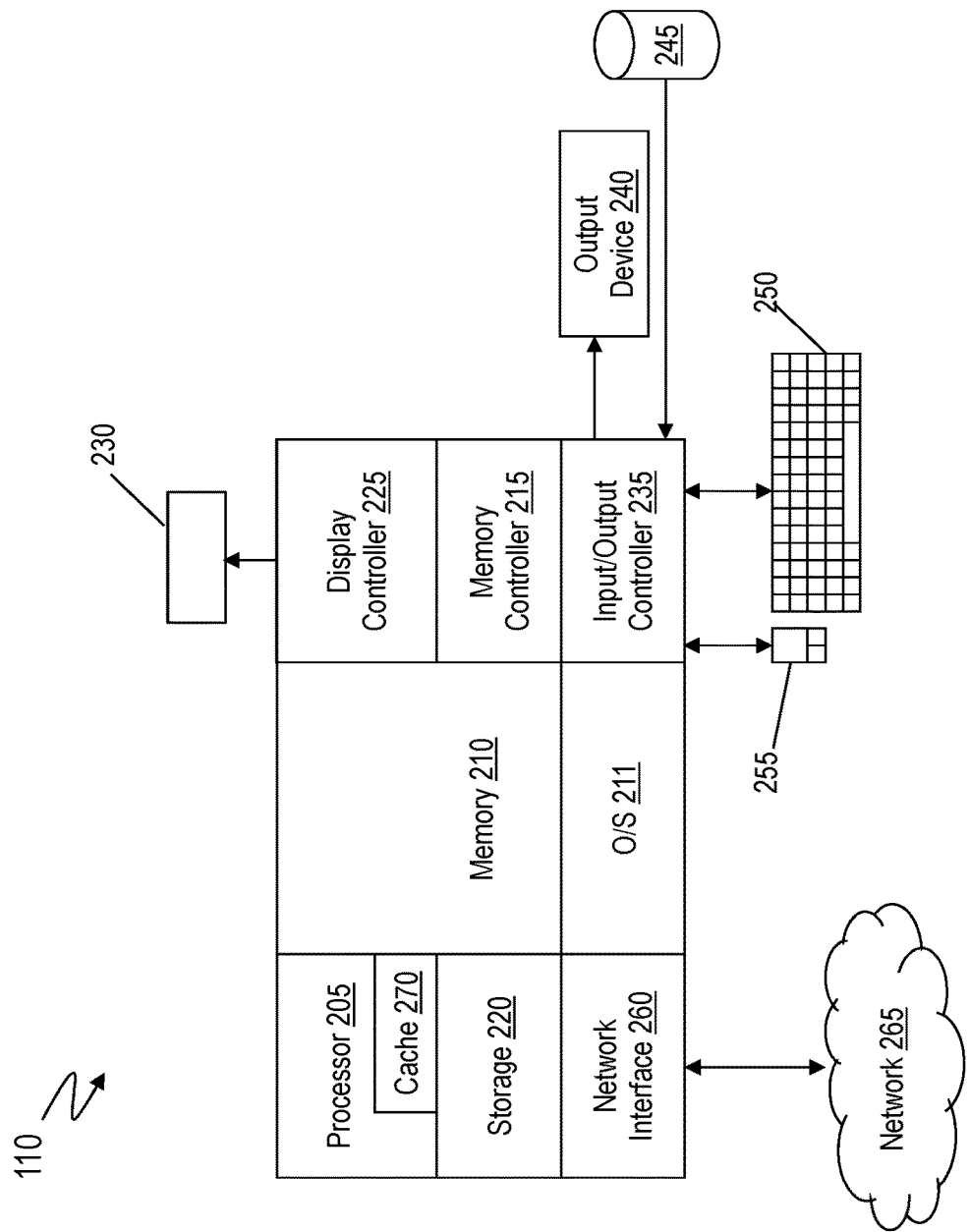
FIG. 4 depicts an example robot, according to one or more embodiments of the present invention.

FIG. 4 depicts an example robot 110, according to one or more embodiments of the present invention. The robot 110 may be a communication apparatus, such as a computer. For example, the robot 110 may be a desktop computer, a tablet computer, a laptop computer, a phone, such as a smartphone, a server computer, or any other such electronic device. In one or more examples, the robot communicates via a network 265. The system 300 includes hardware, such as electronic circuitry.

The robot 110 includes, among other components, a processor 205, memory 210 coupled to a memory controller 215, and one or more input devices 245 and/or output devices 240, such as peripheral or control devices, that are communicatively coupled via a local I/O controller 235. These devices 240 and 245 include, for example, battery sensors, position sensors, indicator/identification lights and the like. Input devices such as a conventional keyboard 250 and mouse 255 are coupled to the I/O controller 235. The I/O controller 235 may be, for example, one or more buses or other wired or wireless connections, as are known in the art. The I/O controller 235 may have additional elements, which are omitted for simplicity, such as controllers, buffers (caches), drivers, repeaters, and receivers, to enable communications.

The I/O devices 240, 245 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 205 is a hardware device for executing hardware instructions or software, particularly those stored in memory 210. The processor 205 may be a custom made or commercially available processor, a central processing unit (CPU), an auxiliary processor among several processors associated with the robot 110, a semiconductor based microprocessor (in the form of a microchip or chip set), a macroprocessor, or other device for executing instructions. The processor 205 includes a cache 270, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 270 may be organized as a hierarchy of more cache levels (L1, L2, and so on).

The memory 210 includes one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 210 incorporates electronic, magnetic, optical, or other types of storage media. Note that the memory 210 may have a distributed architecture, where various components are situated remote from one another but may be accessed by the processor 205.

The instructions in memory 210 include one or more separate programs, each of which comprises an ordered listing of executable instructions for implementing logical functions. In the example of FIG. 2, the instructions in the memory 210 include a suitable operating system (OS) 211. The operating system 211 controls the execution of other computer programs and provides scheduling, input-output control, file and data management, memory management, and communication control and related services.

Additional data, including, for example, instructions for the processor 205 or other retrievable information, is stored in storage 220, which is a storage device such as a hard disk drive or solid state drive. The stored instructions in memory 210 or in storage 220 include those enabling the processor to execute one or more aspects of the systems and methods described herein.

The robot 110 further includes a display controller 225 coupled to a user interface or display 230. In some embodiments, the display 230 may be an LCD screen. In other embodiments, the display 230 may include a plurality of LED status lights. In some embodiments, the robot 110 further includes a network interface 260 for coupling to a network 265. The network 265 may be an IP-based network for communication between the robot 110 and an external server, client and the like via a broadband connection. In an embodiment, the network 265 may be a satellite network. The network 265 transmits and receives data between the robot 110 and external systems. In some embodiments, the network 265 may be a managed IP network administered by a service provider. The network 265 may be implemented in a wireless fashion, for example, using wireless protocols and technologies, such as Wi-Fi™, WiMAX™, satellite, or any other. The network 265 may also be a packet-switched network such as a local area network, wide area network, metropolitan area network, the Internet, or other similar type of network environment. The network 265 may be a fixed wireless network, a wireless local area network (LAN), a wireless wide area network (WAN) a personal area network (PAN), a virtual private network (VPN), intranet or other suitable network system and may include equipment for receiving and transmitting signals.

Referring back to FIG. 3, although a single robot 110 and a single opponent 120 are illustrated, it is understood that the computer gaming system 100 includes multiple robots and opponents 120 playing against each other. Further, the robot 110 may compete against multiple opponents simultaneously. Further yet, a single opponent 120 may be competing against multiple robots simultaneously.

A profile, such as the opponent profile 125 depicts a computer readable depiction of a game-player (robot 110, or opponent 120) personality. In one or more examples, the robot 110 generates the opponent profile 125 by capturing one or more observations about the opponent 120 during the game play. For example, the robot 110 uses one or more input devices such as a camera, a microphone, biometric sensors (e.g. heart rate monitor, iris monitor etc.) to monitor one or more out-of-game actions of the opponent 120. In addition, the robot 110 monitors the in-game actions of the opponent 120 based on input from opponent to interact with the robot 110 to play the game. Based on the monitored traits of the opponent 120, the robot 110 generates the opponent profile 125. In addition, in one or more examples, the robot 110 uses a previous opponent profile from the profile repository 130, which it updates based on the monitored traits of the opponent 120. The profile is an electronic profile that can be stored in a memory device.

Table 1 illustrates an example opponent profile 125. In one or more examples, the depicted profile is for a game of poker. The depicted opponent profile 125 includes four variables forming two rows of a 2d matrix: [g1 g2] and [r1 r2]. The first row [g1 g2] signifies the out-of-game actions of the opponent 120, while the second row [r1 r2] specifies a risk profile of the opponent 120 based on the in-game actions of the opponent 120.

TABLE 1

| g1 | g2 |
|----|----|
| t1 | t2 |

For example, g1 specifies an aggressiveness of the opponent 120 based on out-of-game actions of the opponent 120. In one or more examples, the out-of-game action includes speech uttered by the opponent 120 during the game play. For example, the aggressiveness value is determined using a neural network, accessed via an application-programming interface (API), such as IBM™ WATSON™ personality insights service. In one or more examples, the robot 110 converts the speech from the opponent into text and feeds the converted text into the API. In one or more examples, the robot 110 captures the speech from the opponent using a microphone, the speech being provided as input to the API for determining the aggressiveness value g 1. It should be noted that the in other examples, the robot 110 determines the aggressiveness value using additional or different out-of-game actions of the opponent 120.

In one or more examples, g2 specifies a confidence of the opponent 120 that is predicted based on out-of-game actions of the opponent 120. In one or more examples, the out-of-game actions include facial expressions of the opponent 120 during game play. For example, the confidence value is determined using a neural network, accessed via an API such as IBM™ WATSON™ visual recognition service. In one or more examples, the robot 110 captures still images, or video snippets of the opponent 120 using a camera, which are provided to the API to determine the confidence value g2. It should be noted that the in other examples, the robot 110 determines the confidence value using additional or different out-of-game actions of the opponent 120.

Further, the values t1 and t2 in the example opponent profile 125 depict risk parameters for the opponent 120 based on the in-game actions of the opponent 120. For example, in case the opponent profile 125 is for a game of poker, the values t1 and t2 respectively depict a lower probability threshold and a higher probability threshold associated with the opponent 120. For example, in case the opponent 120 is dealt a hand with a probability of winning at or below the lower probability threshold, the opponent 120 folds; and with a probability of winning at or above the lower probability threshold, the opponent 120 gambles a larger amount of money than average. In one or more examples, the computer gaming system 100 determines the risk parameters for the opponent using a custom neural networks service, such as using IBM™ BLUEMIX™.

In one or more examples, the four variables are normalized to lie between 0 to 1. In this case, the opponent profile 125 indicates the opponent's risk profile as a mathematical vector [t1 t2] where 0<t1, t2<1. Consider an example where the opponent 120 is a human playing poker with the robot 110, where the opponent profile 120 indicates the human's risk taking personality is [0.3 0.5]. The opponent profile 125 thus indicates that the human folds below 0.3, checks between 0.3 and 0.5, and bets above 0.5. It should be noted that the vector indicating the risk parameters represent different attributes than the probability thresholds described herein in other examples. For example, extraversion, openness, neuroticism, agreeableness, conscientiousness.

In one or more examples, the robot 110 competing against the opponent 120 asks the opponent one or more questions and records the answers provided by the opponent. The answers are considered out-of-game actions of the opponents. In addition, the robot 110 captures one or more out-of-game actions of the opponent 120 while answering the questions, such as facial expressions, hand movements, perspiration, twitching, eye movements, finger snapping, lip movements, etc. The robot 110 sends the out-of-game actions to the custom neural network service such as IBM WATSON™ BLUEIVIIX™, or the like to get scores associated with the one or more personality traits, such as those listed above. The scores are recorded in the opponent profile 125 in an electronic form to be used by the robot 110 to determine in-game actions and to confuse the opponent 120 during gameplay.

In one or more examples, the robot computes a risk-parameter that represents risk-taking ability of the robot 110 based on the scores associated with the personality traits. For example, the risk taking ability of the robot 110, provided by the robot profile 115, is based on extraversion, openness, neuroticism, and extraversion scores of the opponent 120. The personality traits scores of the opponent 120 are normalized to a range such as 0 to 1. The computer gaming system 100 classifies the personality traits scores using predetermined ranges, such as 3 ranges: 0.2-0.4, 0.6-0.7, 0.8-0.9. The predetermined ranges are used to randomly select values like (0.3, 0.65, 0.85) from each respective range, the selected values used by the robot 110 to determine an in-game action to play in the game. In one or more examples, the robot 110 provides the selected values as input to a game-play service to receive the in-game action to take in response from the game-play service such as call the Poker service of IBM™ WATSON™ to play a game of Texas Hold'em Poker. It should be noted that in other examples, a different game may be played, a different service may be used, and different values may be selected as input, than those illustrated in the example above.

Further yet, in one or more examples, the technical solutions herein facilitate defining the risk taking profile of the robot 110 using ranges, instead of constant values. For example, a robot 110 has the following constants (0.3, 0.5, 0.7). Instead of assigning constant values to the robot 110 in the robot profile 115, the technical solutions herein define a range of constants: (0.10-0.40, 0.50-0.70, 0.80-0.95). The ranges specify the limits from which the robot 110 selects a set of constants say (0.25, 0.60, 0.85) to play in a particular game, depending on the opponent 120 and corresponding opponent profile 125. The robot 110 thus gets the flexibility to select a set of values by still being in the range of its risk limits, which are defined by the ranges in the robot profile 125 (0.10-0.40, 0.50-0.70, 0.80-0.95).

Each time the robot 110 plays or takes an in-game action, the robot 110 selects a random value from the limits specified in the risk profile 115: (0.10-0.40, 0.50-0.70, 0.80-0.95). The selected values are then provided to the play game service to determine the move to be made in the game. By doing this, the robot 110 introduces an element of uncertainty in the game and the opponent 120 is not able to predict a move by the robot over time. For example, table 2 lists example profile data accumulated in the profile repository 130 for the robot profile 115.

TABLE 2

| Game # | Input Value-1 | Input Value-2 | Input Value-3 | Game Outcome (1 = robot win; 0 = robot lost) |
|---|---|---|---|---|
| 1 | 0.27 | 0.50 | 0.86 | 0 |
| 2 | 0.25 | 0.58 | 0.88 | 1 |
| 3 | 0.28 | 0.50 | 0.85 | 0 |
| 4 | 0.25 | 0.57 | 0.89 | 1 |
| 5 | 0.28 | 0.54 | 0.85 | 0 |

The above example data is for the robot 110 selecting random input values from the range in the robot profile 115 (0.10-0.40, 0.50-0.70, 0.80-0.95) for different games played against a specific opponent 120. The data also includes outcomes of each of the games (Column 5).

In one or more examples, after the game is over, the robot 110 collects at least the following information: a) opponent's actual game strength, for example hand-strength in poker (robot 110 determines this during the game play) b) opponent's in-game actions recorded throughout the game (e.g., in case of poker, when the user checked, bet, and folded). Using the collected information, the robot 110 predicts the risk-taking ability values of [t1 t2 . . . ] using the custom neural networks service. For example, the computer gaming system 100 analyzes the above data from table 2 to determine (t1, t2, and t3) as the input-values to use based on the input-values that led the robot 110 to win against the opponent 120.

In the example opponent profile 125 of table 1, the two rows combine to form a 2d matrix depicting a personality of the opponent 120. It should be noted that in other examples, additional or different values are included in the opponent profile 125.

Further, it should be noted that the neural networks used by the computer gaming system 100 are artificial neural network implementations, which include one or more neural networks such as a feedforward neural network, a radial basis function network, a convolutional neural network, a recurrent neural network, a cascading neural network, a spiking neural network, a neuro-fuzzy network, or any other type of neural network implementation. With each new profile-outcome recorded in the profile repository 130, the neural network layers get more precise, thus facilitating the computer gaming system 100 to predict whether the current robot profile 115 which the robot 110 has selected will lead it to win or not. Based on this classification, the robot 110 is configured with the robot profile 115, which has a higher probability of winning.

Figure 5:
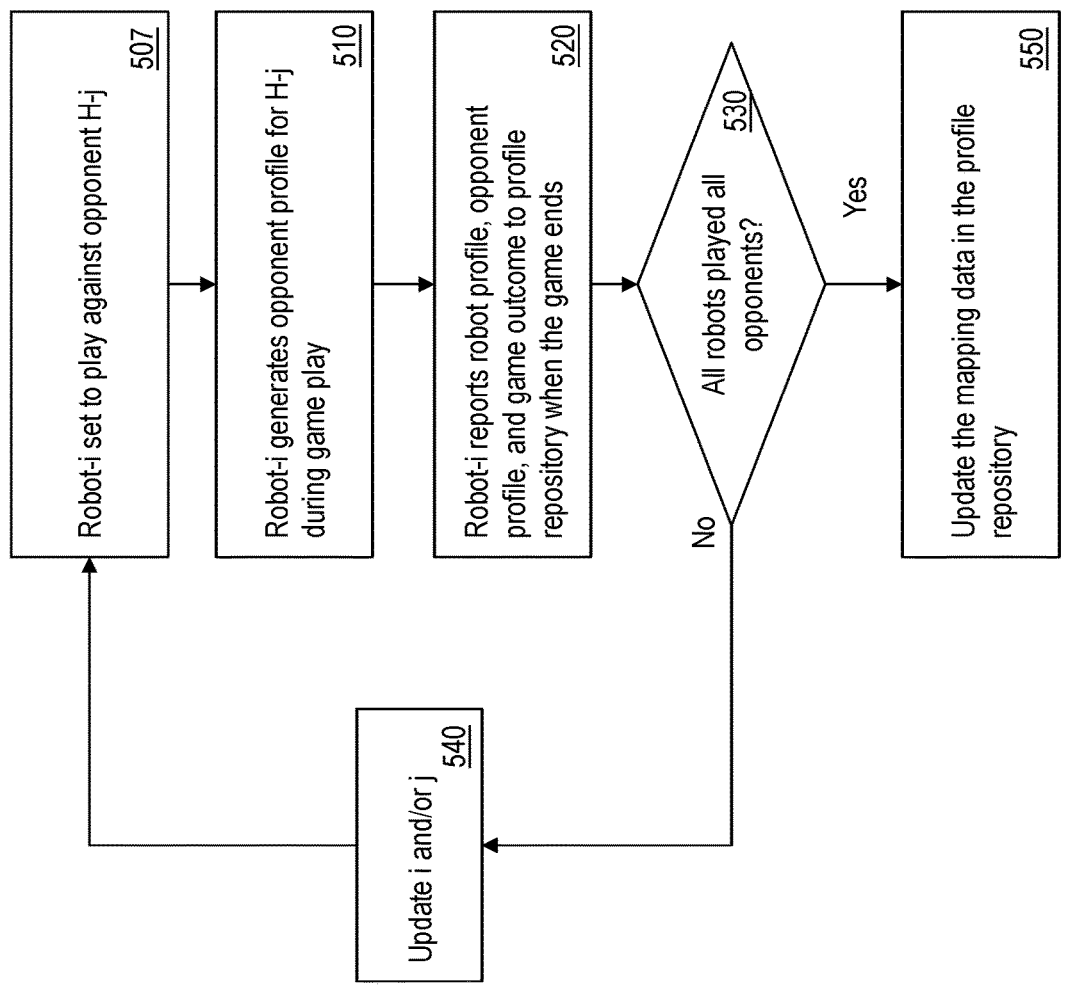
FIG. 5 illustrates a flowchart of an example method for a computer gaming system to train robot models, according to one or more embodiments of the present invention.

FIG. 5 illustrates a flowchart of an example method for the computer gaming system 100 to train robot models, according to one or more embodiments of the present invention. The computer gaming system 100 trains multiple robot models by having multiple robots 110 to play with multiple opponents 120. Consider n robots 110 (connected to a custom neural network, such as BLUEMIX™ via a network, or via the internet of things (IoT)). The robots 110 each have respective robot profiles 115 R1, R2 . . . Rn (say n=10). Further, consider that the robots 110 compete against opponents 120 with opponent profiles H1, H2 . . . Hm (say m=50). The computer gaming system 100 initiates all of the robots 110 with respective robot profiles 115. Each robot profile 115 of the n robots 110 is different from each other, so that each of the robots 110 has a different personality, and in turn, each of the robots 110 reacts differently to any single opponent 120.

Each of the robots 110 plays a game with each of the opponents 120, as shown at 507. For example, robot 110 with robot profile Ri plays against an opponent 120 with opponent profile Hj. During the game, the robot 110 predicts the opponent profile's Hj-i, as shown at 510. For example, the robot 110 generates a matrix, such as the 2d matrix illustrated in table 1, using custom neural network services. When the game ends, the robot 110 reports the robot profile Ri, the opponent profile Hj-i (that the robot 110 generated), and the outcome of the game (win/lose), as shown at 520. The computer gaming system 100 ensures that each of the robots 110 generates and reports a corresponding opponent profile (e.g. Hj-1, Hj-2 . . . Hj-n), for each of the opponents 120 by ensuring that each robot 110 plays each opponent 120 (n×m games, in the above example 500), as shown at 530. If a game has not yet been played, the computer gaming system 100 adjusts the values for i and/or j, as shown at 540. Once all the games have been played, the computer gaming system 100 updates the mapping data 140 in the profile repository 130, as shown at 550.

In one or more examples, the computer gaming system 100 maintains two separate lists in the profile repository, a first list including information for games in which the opponent 120 lost against the robot 110; and a second list including information for games in which the opponent 120 beat the robot 110. It should be noted that in games that can result in states different than win/lose, for example a tie (or draw), the computer gaming system 100 maintains additional/different lists in the mapping data 140 corresponding to the states of the game being played.

The technical solutions described herein facilitate the computer gaming system 100 to configure the robot profile 115 of the robot 110 to defeat, or at least increase the chances of the robot 110 to defeat the opponent 120 using the mapping data 140.

Figure 6:
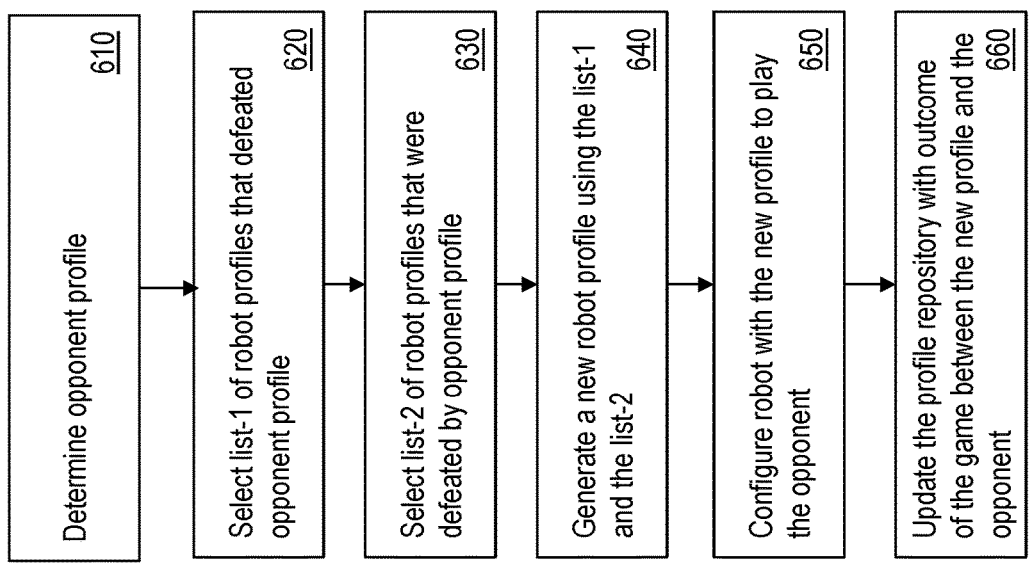
FIG. 6 illustrates a flowchart of an example method for generating a robot profile using the mapping data, according to one or more embodiments of the present invention.

FIG. 6 illustrates a flowchart of an example method for generating a robot profile using the mapping data, according to one or more embodiments of the present invention. Consider that the opponent 120 is playing against the robot 110. The computer gaming system 100 identifies the opponent profile 125, as shown at 610. In one or more examples, the computer gaming system 100 determines the opponent profile 125 for the opponent 120 playing against the robot 110 based on the unique opponent identification. For example, the profile repository 130 maintains the opponent identification, such as a username, serial number, or any other such identification mark with each opponent profile 125. To continue the above example that was used to describe the training of the robots 110, consider that the opponent 120 has the profile H41 and is playing against the robot 110 with the robot profile R5.

The computer gaming system 100 accesses the profile repository 130 to identify and select a first list of robot profiles 115 that defeated the opponent profile 125 (H41), as shown at 620. Consider that [R1 R5 R7] is the list of robot profiles that defeated the opponent with the profile H41 during the training phase above. This first list may also be referred to as positive samples. The computer gaming system 100 further accesses the profile repository 130 to identify and select another, a second list of robot profiles 115 that were defeated by the opponent profile 125 (H41), as shown 630. Consider that [R2 R3 R9 R10] is the list of robot profiles that were defeated by H41. The second list may also be referred to as negative samples.

The computer gaming system 100 uses the positive samples and the negative samples to generate a new robot profile that is more like the positive samples, and lesser like the negative samples, as shown at 640. For example, the new robot profile is generated by feeding the positive and negative samples into the custom built neural networks service, such as in BLUEMIX™, or any other neural network service. For the description herein, the new profile in this case is named R5_41, an adjusted robot profile based on the robot profile R5 modified to compete against opponent profile H41.

The robot 110 is configured to use the adjusted robot profile R5_41 to compete against the opponent 120 with the opponent profile H41, as shown at 650. The robot 110 is thus trained to with the adjusted robot profile R5_41 to play against H41, as the robot 110 is more likely to defeat H41 than any other personality. Once the game is completed, the robot 110 updates the profile repository 130 with the outcome of the game between the adjusted profile and the opponent profile H41, as shown at 660.

The updated includes updating the positive samples representing the 'defeated from robot data' of H41 in the mapping data 140 as: [R5_41 R1 R5 R7], if the robot 110 wins with the adjusted profile R5_41. Else, if the robot does not defeat H41 the computer gaming system 100 updates the negative samples representing the 'won from robot data' of H41 in the mapping data 140 as: [R5_41 R2 R3 R9 R10]. By updating the mapping data 140 with new positive and negative samples for the opponent 120 with the opponent profile H41, the computer gaming system 100 improves the classification accuracy for generating the next adjusted profile to compete against H41, in long term.

The above method is used when the opponent 120 who is known to the computer gaming system 100 logs in to play the game. In one or more examples, the opponent 120, logs into the system using his/her username or other form of identification. The computer gaming system 100 proceeds to implement the above method in response to the opponent 120 having an existing opponent profile 125.

Figure 7:
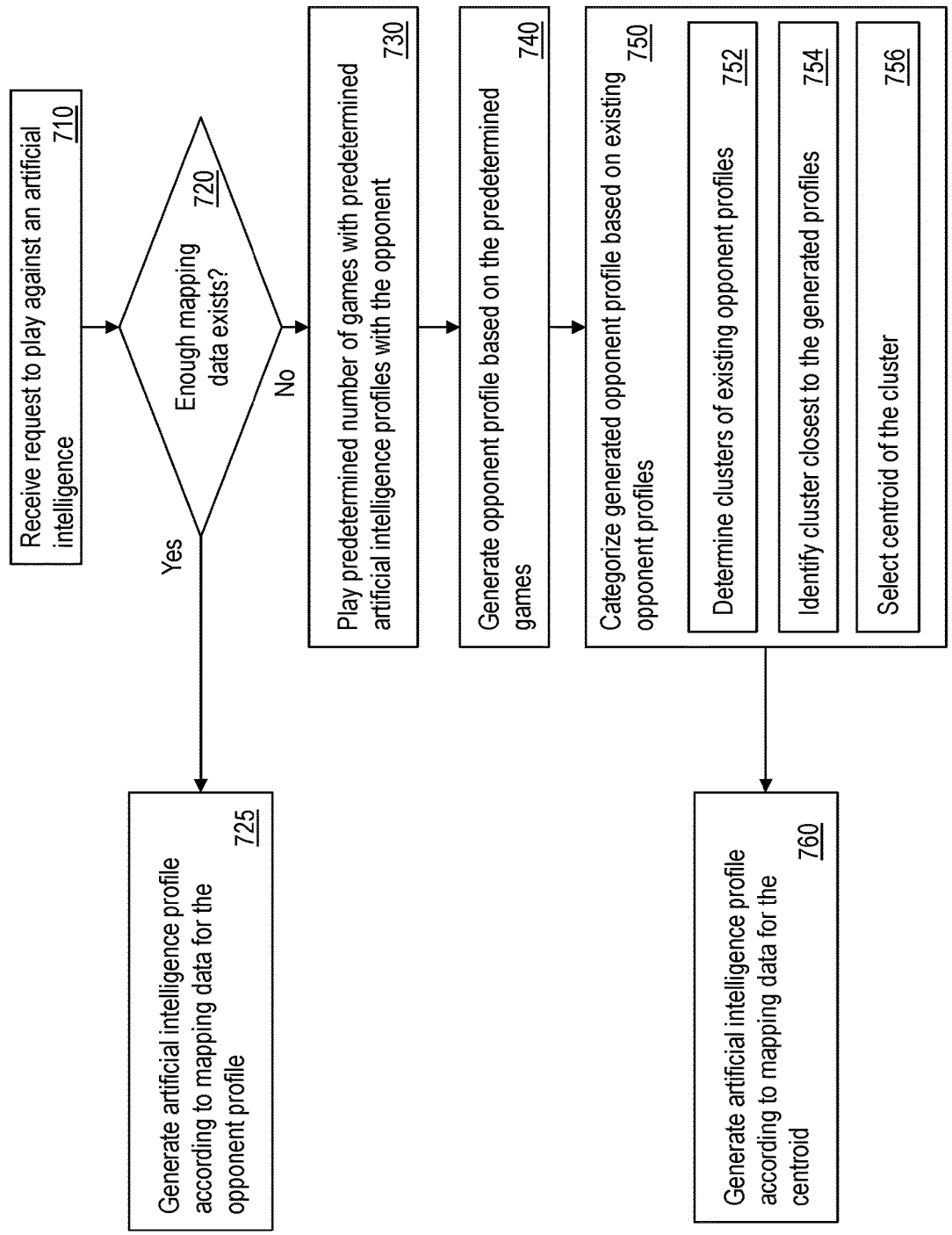
FIG. 7 illustrates a flowchart of an example method for generating a robot profile for a new opponent, according to one or more embodiments of the present invention.

FIG. 7 illustrates a flowchart of an example method for generating a robot profile for a new opponent, according to one or more embodiments of the present invention. The computer gaming system 100 receives a request to play against one of the robots 110, as shown at 710. The request is received from the opponent 120. The request includes an identification of the opponent 120, such as a username, password, or any other identifier or a combination thereof.

The computer gaming system 100 determines if the opponent 120 that is requesting to play the game has corresponding opponent profile 125 with enough information in the mapping data 140, as shown at 720. In one or more examples, the computer gaming system 100 determines that there is enough information in response to the profile repository 130 including outcomes of at least a predetermined number of games played by the opponent profile 125.

If the opponent profile 125 has at least the predetermined number of outcomes recorded in the mapping data 140 of the profile repository 130, the computer gaming system 100 generates an adjusted robot profile to play against the opponent 120 based on the positive and negative samples from the mapping data 140 (see FIG. 6), as shown at 725. In one or more examples, the computer gaming system 100 determines that there is enough information if there are at least a first predetermined number of positive samples, and at least a second predetermined number of negative samples in the mapping data 140. The first and second predetermined number is the same in one or more examples, and different in one or more examples. Accordingly, if the mapping data 140 includes at least the first and second predetermined number of positive and negative samples respectively, the computer gaming system 100 generates the robot profile to play against the opponent using the positive and negative samples.

Else, if the mapping data 140 does not have enough information, the computer gaming system 100 creates the opponent profile 125 by having the opponent 120 play against a set of predetermined robot profiles, as shown at 730 and 740. For example, the computer gaming system 100 sequentially configures the robot 110 using one of the predetermined robot profiles from the predetermined set and has the robot 110 play against the opponent 120. The robot 110 captures information for the opponent profile 125 during the game play. The robot 110 also stores the outcomes of the games using the predetermined set of robot profiles. In one or more examples, the predetermined set of robot profiles has the same number of predetermined robot profiles as is used to determine whether the profile repository 130 has enough information about the opponent profile 125.

The computer gaming system 100 further categorizes the generated opponent profile based on existing opponent profiles 125, as shown at 750. Categorizing the generated opponent profile includes determining clusters of existing opponent profiles 125 from the profile repository 130, as shown at 752. For example, the clustering is performed using k-means, or any other such algorithm using the opponent profiles matrices. In one or more examples, the computer gaming system 100 computes the centroids of each cluster that is identified. The centroid is another matrix that includes the computed values that the computer gaming system 100 can interpret as an opponent profile.

The categorizing of the newly generated opponent profile further includes identifying a cluster closest to the generated profile, as shown at 754. The closest cluster is determined by computing distances between the newly generated opponent profile and the centroids of the clusters. The distances computed are in Cartesian coordinate system, in one or more examples. Alternatively, the Euclidean coordinate system is used. Any other coordinate system can be used in other examples. The same coordinate system used when clustering the existing opponent profiles 125 is used when determining the distance between the newly generated opponent profile and the centroids of the clusters.

The categorizing further includes selecting the centroid of the closest cluster, as shown at 756. The selected centroid is then used to represent the opponent profile 125 of the opponent 120 that requested the game play. The computer gaming system 100 further generates the robot profile 115 for the robot 110 to play the opponent 120 according to mapping data for the selected centroid, as shown at 760.

In one or more examples, the opponent profiles 125 stored in the profile repository 130 are from the multiple robots from the computer gaming system 100. Accordingly, a first robot uses opponent profile and outcome stored by a second robot, and vice versa when the corresponding opponent requests to play against one of those robots. Each robot 110 is an independent AI system/device in itself that stores the outcome of playing a game with the opponent 120 in the profile repository 130 and updates the mapping data 140 accordingly.

Thus, the computer gaming system 100 described herein facilitates independent AI devices defeat opponents, such as humans in games like poker, chess etc. The collaboration overcomes technical challenges faced when generating robot profiles for AI devices to play a game against a human opponent. For example, defeating someone in a game is not a transitive relation; that is, if A defeats B and B defeats C, then it does not mean that A will defeat C. This happens because defeating someone not only includes the game strategy, but also body language, behavior, aggressiveness, and other such factors that can discourage a good player such that s/he starts losing in the game. The technical solutions herein address such technical challenges by converting personality data into computer readable data in order to defeat the opponents. Further, the technical solutions use a combination of game strategy and the human personality (both defined in mathematical computer readable form) in order to train or configure a robot and evolve into a personality that can defeat the opponent. The technical solutions also facilitate defeating a human opponent considering one-to-one relations between two players (instead of transitive relations), and uses the relations to create the evolved personality for the robot playing the opponent, so that the robot is more likely to defeat the opponent (human).

Thus, the technical solutions facilitate intelligence sharing between independent AI devices to collaborate and defeat a human opponent based on respective experience. The technical solutions further facilitate inferring and using personality trait in addition to game strategy by using clustering and neural networks to train an AI device (robot) to demonstrate a random personality trait, such as aggression, extraversion etc., different from what the human opponent is expecting from the robot, in order to confuse the human opponent in an attempt to defeat the human opponent with an evolved game strategy. Further, the technical solutions facilitate the independent AI devices collaborate about game strategy and further about personality traits of a human opponent to adapt gameplay. The technical solutions facilitate determining game strategy intelligence based on in-game actions that are associated with the gameplay, and further determining the personality traits based on out-of-game actions of the human opponent, such as speech, facial expressions, perspiration, hand movements, and the like. The technical solutions thus facilitate a computer game system to adapt to different human opponents with different personalities, by generating different robot profiles to compete against the human opponents. The technical solutions thus provide an improvement to computer technology by facilitating determination of the personality traits in computer readable form, and further sharing the determined personality traits across multiple independent AI devices (robots) to train a robot to compete against a human opponent with the determined personality traits. The technical solutions accordingly provide techniques, such as rules for operation of a computer system, such as a computer game system, to operate and train an AI device.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    identifying an electronic opponent profile for an opponent;
    selecting, from a profile repository, a first set of robot profiles, wherein robots trained using robot profiles from the first set of robot profiles have previously defeated the opponent;
    selecting, from the profile repository, a second set of robot profiles, wherein robots trained using robot profiles from the second set of robot profiles have previously lost to the opponent;
    generating a current robot profile based on the first set of robot profiles and the second set of robot profiles; and
    configuring a robot according to the current robot profile to play against the opponent.

2. The computer-implemented method of claim 1, further comprising:
    reporting the current profile and outcome of a game between the robot and the opponent to the profile repository.

3. The computer-implemented method of claim 1, wherein the electronic opponent profile is identified using an identification of the opponent.

4. The computer-implemented method of claim 1, wherein the electronic opponent profile comprises risk-parameters associated with the opponent.

5. The computer-implemented method of claim 1, wherein the electronic opponent profile comprises personality traits scores associated with the opponent.

6. The computer-implemented method of claim 5, further comprising:
    recording out-of-game actions of the opponent; and
    determining the personality traits scores based on the out-of-game actions of the opponent.

7. The computer-implemented method of claim 5, further comprising:
    computing a range of risk-parameters of the robot based on the personality traits scores of the opponent; and
    storing the range of risk-parameters of the robot in the current robot profile.

8. The computer-implemented method of claim 7, further comprising:
    selecting an input value within the range of risk-parameters from the current robot profile;
    determining an in-game action for the robot based on the selected input value; and
    making the in-game action by the robot.

9. The computer-implemented method of claim 5, wherein the personality traits scores associated with the opponent represent at least one from a group consisting of aggressiveness, extraversion, openness, neuroticism, agreeableness, and conscientiousness.

10. A computer-game system comprising:
a memory;
a robot configured to play a game against an opponent; and
a processor coupled with the memory and the robot, the processor configured to:
identify an electronic opponent profile for the opponent;
select, from a profile repository, a first set of robot profiles, wherein robots trained using robot profiles from the first set of robot profiles have previously defeated the opponent;
select, from the profile repository, a second set of robot profiles, wherein robots trained using robot profiles from the second set of robot profiles have previously lost to the opponent;
generate a current robot profile based on the first set of robot profiles and the second set of robot profiles; and
configure the robot according to the current robot profile to play against the opponent.

11. The computer-game system of claim 10, the processor further configured to:
report the current profile and outcome of a game between the robot and the opponent to the profile repository.

12. The computer-game system of claim 10, wherein the electronic opponent profile is identified using an identification of the opponent.

13. The computer-game system of claim 10, wherein the electronic opponent profile comprises risk-parameters associated with the opponent.

14. The computer-game system of claim 10, wherein the electronic opponent profile comprises personality traits scores associated with the opponent.

15. The computer-game system of claim 14, the processor further configured to:
record out-of-game actions of the opponent; and
determine the personality traits scores based on the out-of-game actions of the opponent.

16. The computer-game system of claim 15, the processor further configured to:
compute a range of risk-parameters of the robot based on the personality traits scores of the opponent; and
store the range of risk-parameters of the robot in the current robot profile.

17. The computer-game system of claim 16, the processor further configured to:
selecting an input value within the range of risk-parameters from the current robot profile;
determining an in-game action for the robot based on the selected input value; and
making the in-game action by the robot.

18. A computer program product for training a robot for gameplay, the computer program product comprising a computer readable storage medium having program instructions embodied therewith, the program instructions executable by a processing circuit to cause the processing circuit to:
identify an electronic opponent profile for an opponent;
select, from a profile repository, a first set of robot profiles, wherein robots trained using robot profiles from the first set of robot profiles have previously defeated the opponent;
select, from the profile repository, a second set of robot profiles, wherein robots trained using robot profiles from the second set of robot profiles have previously lost to the opponent;
generate a current robot profile based on the first set of robot profiles and the second set of robot profiles; and
configure a robot according to the current robot profile to play against the opponent.

19. The computer program product of claim 18, wherein the electronic opponent profile comprises personality traits scores associated with the opponent.

20. The computer program product of claim 19, the program instructions further cause the processing circuit to:
record out-of-game actions of the opponent; and
determine the personality traits scores based on the out-of-game actions of the opponent.

* * * * *